(12) United States Patent
Goldenberg

(10) Patent No.: US 8,734,162 B2
(45) Date of Patent: May 27, 2014

(54) SERVER AND APPLICATION FOR INTERACTIVE GAMEPLAY

(76) Inventor: David Goldenberg, San Francisco, CA (US)

( * ) Notice: Subject to any disclaimer, the term of this patent is extended or adjusted under 35 U.S.C. 154(b) by 101 days.

(21) Appl. No.: 13/439,835

(22) Filed: Apr. 4, 2012

(65) Prior Publication Data

US 2013/0267286 A1 Oct. 10, 2013

(51) Int. Cl.
*A63F 9/18* (2006.01)
*G09B 7/06* (2006.01)

(52) U.S. Cl.
USPC ................. 434/322; 434/327; 463/9

(58) Field of Classification Search
USPC ........................ 463/9; 434/322, 327
See application file for complete search history.

(56) References Cited

U.S. PATENT DOCUMENTS

| 7,918,666 | B1 * | 4/2011 | Lewolt | 434/322 |
| 2008/0235071 | A1 * | 9/2008 | Gutta et al. | 705/9 |
| 2009/0253476 | A1 * | 10/2009 | Pestotnik | 463/9 |
| 2012/0221975 | A1 * | 8/2012 | Juristovski et al. | 715/823 |

OTHER PUBLICATIONS

Coniam, A Preliminary Inquiry into Using Corpus Word Frequency Data in Automatic Generation of English Close Tests, Calico Journal, No. 2-4, pp. 15-33, 1997.*

* cited by examiner

*Primary Examiner* — Damon Pierce
(74) *Attorney, Agent, or Firm* — Pillsbury Winthrop Shaw Pittman LLP

(57) ABSTRACT

An interactive game and gaming system are presented. In some aspects, information is derived from a database and a select subset of it is used to generate both questions and potential answers to the questions. A player is presented with the potential answers and selects an answer, which is evaluated by the system to determine its correctness. Commercial advantages of interacting with players in this way and collecting information about the players and promoting things to the players are described.

20 Claims, 3 Drawing Sheets

SERVER AND APPLICATION FOR INTERACTIVE GAMEPLAY

TECHNICAL FIELD

The present disclosure relates to systems and methods for online gameplay. Specifically for playing a game where the player is challenged to select a correct answer to a query posed to the player by the system. The game may be played on a computer connected to a network including the game server and song lyric database.

BACKGROUND

Interactive electronic and computer games have proliferated. The games include aspects that entertain their users or players. Other aspects generate profit for the party putting on the games or distributing or selling the games. Other aspects raise awareness of an issue or promote a product or a company.

One common aspect to gaming, especially online gaming, is that a player can interact with a client machine (computer, mobile device) by way of a browser or client application. The client machine then uses an interface and a network (wired, wireless) connection to interact with a server machine that serves content and information to the client for the purpose of driving the game play. Another feature of online gaming, especially in games that are free to players to play, is that the game is used as a platform for promotion of other things. This can be done by presenting pop up type or banner type advertising to a player of the game. Yet another common feature of online gaming is to encourage a player to sign up for a service or to create an account or to join a database of players that include information about the player. Providers of interactive games can benefit from information about the community of players, including demographic information and information about why the players like the game or dislike it and information about what interests the players and how the players react to the game and the products and services being promoted.

A source of information or database from which queries (questions) to players can be derived is used to formulate both the queries and a plurality of possible responses (answers) to the queries.

SUMMARY

A gaming server pulls queries and formulates questions from a database. In addition, possible answers, only some of which are correct, are formulated from the contents of the database. A user is challenged to select a correct response or answer to the query or question posed during a segment of the game or a round of the game. Advertising and other commercially useful information are presented to the user and collected from the user in the course of playing the game. A user's profile or demographic characteristics may be used to drive the generation of the queries and/or the presented possible responses.

Some embodiments are directed to a method for interactive game play, comprising obtaining a set of baseline data in one or more documents or files; extracting select data of a desired characteristic from the baseline data; formulating a query to a player from the select data; formulating a query to a player from the select data; presenting the query and the plurality of potential responses to the query to the player; receiving the player's response to the query; and determining whether the player's response to the query matches a criterion for correctness of the response.

BRIEF DESCRIPTION OF THE DRAWINGS

A preferred embodiment of the invention will now be described by way of specific example with reference to the accompanying drawings, in which.

DETAILED DESCRIPTION

Figure 1:
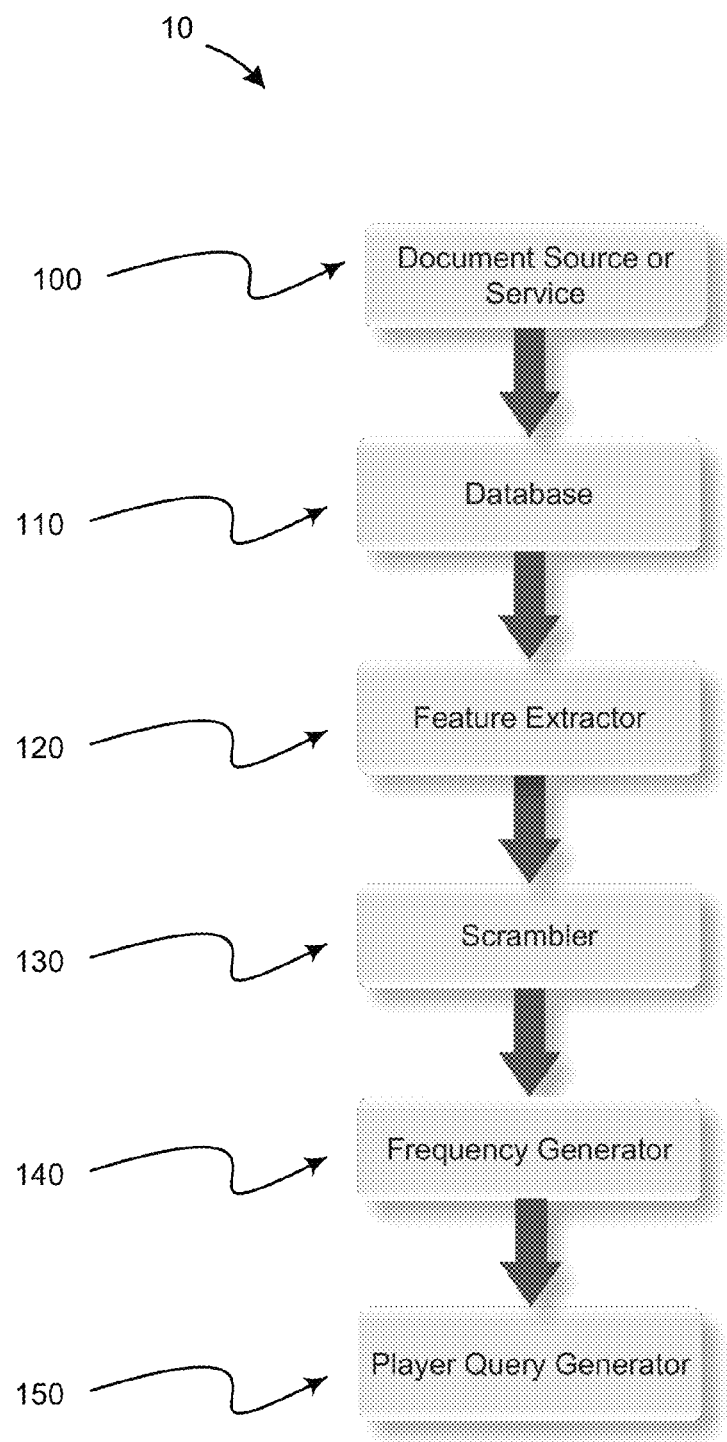
FIG. 1 illustrates an exemplary group of components in data communication with certain ones of the group and which collectively can be used in generating queries or questions for a player.

FIG. 1 illustrates an exemplary system 10 or group of components in data communication with certain ones of the group and which collectively can be used in generating queries or questions for a player. A document source or a service 100 provides or generates data used in the gameplay. For example, document source or service 100 may be a service that provides a subscription based source of data that can be used to generate questions and answers. The data or information obtained from the document source or service 100 is stored in a database 110. The database may be co-located with the document source or service 100, or it may be remotely located over a network, or it may be co-located in a storage device in a Web server, application server, or other server that can communicate with a player's client device.

A player client device may be a conventional client machine such as a personal computer. The player client device may also be a conventional mobile communication device, mobile computing device, smartphone or similar appliance. The components of system 10 may be implemented in hardware, software, firmware, or combinations of the foregoing. For example, computer-readable media in the system may include computer-readable instructions stored in a data storage apparatus or memory. The instructions can be parsed and executed on a processor circuit as known by those skilled in the art.

A feature extractor component 120 is programmed for and adapted and arranged to extract a certain type of feature from the database 110 or the information therein. For example, the feature extractor 120 may pull up and selectively provide certain aspects or subsets of information from that available in database 110. As an example by way of illustration, the feature extractor 120 may be programmed to pull out the words in a file, the images in a file, or other selected information.

The selected extracted information or extracted feature of the data taken from the database 110 may be scrambled or randomized by way of scrambler component 130. The scrambler can enhance the gameplay and control its level of difficulty. The scrambler can act to randomize queries (questions) to the player and/or randomize possible responses (answers) to the queries so that even the same subset of data can be presented in different formats from time to time. In one embodiment, the scrambler 130 may scramble the question or query order. In another embodiment, the scrambler 130 may scramble the set of possible answers and the order in which they appear to the player.

In some embodiments, a frequency generator 140 generates metrics corresponding to the frequency with which certain information appears in the database 110. Information that occurs more often in the database or source document may be given a greater weight or given a more pronounced appearance to the user.

A server in system 10 will serve up the queries to the player and collect the player's answers. The queries may be determined by the player's profile if the player is known to the system 10 as will be discussed below.

Figure 2:
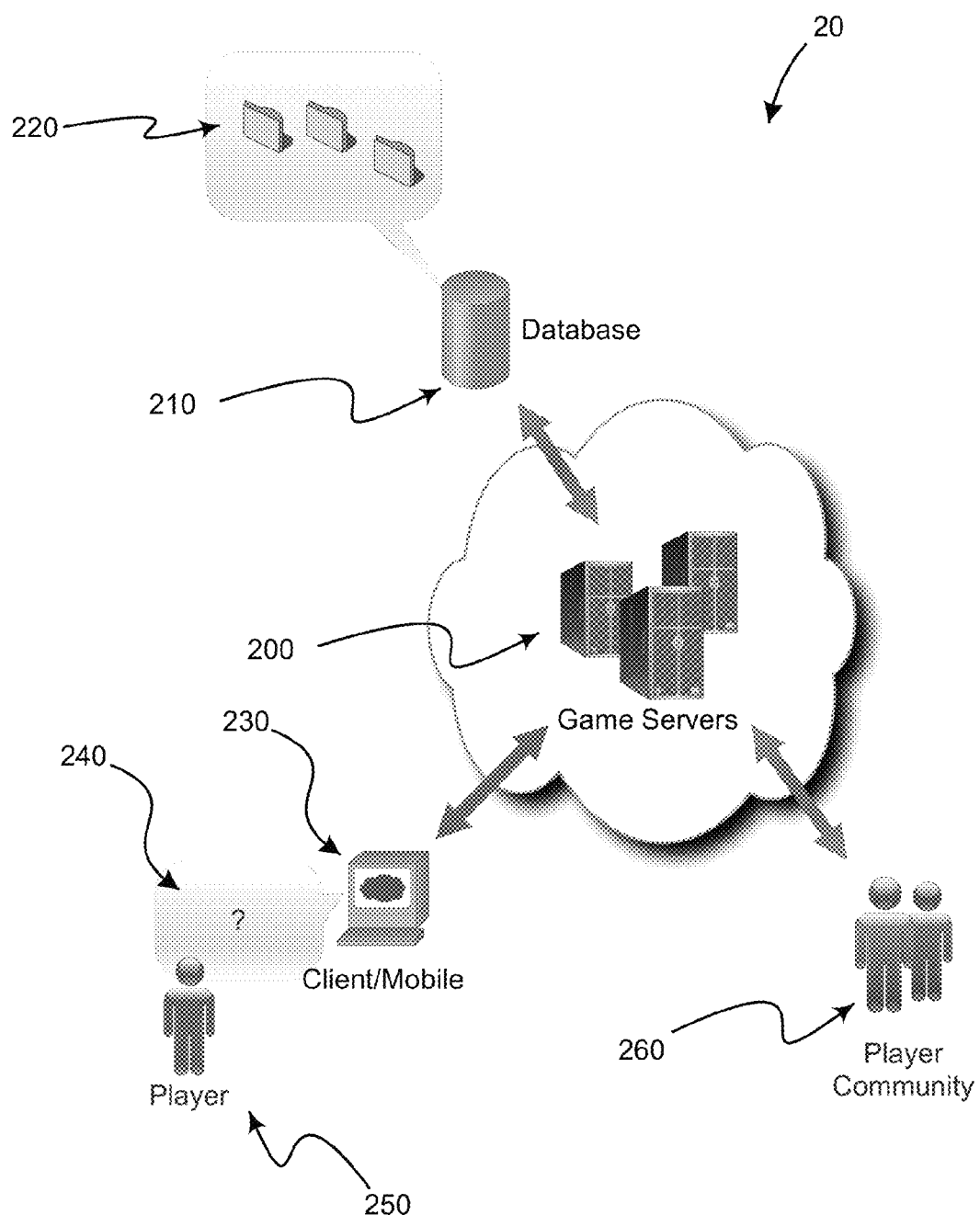
FIG. 2 illustrates an exemplary system for interactive gameplay.

FIG. 2 illustrates a system 20 for interactive gameplay. One or more gaming servers 200 are provided to interact with other components of the system, to process information from data repositories or databases 210. In addition, servers 200 may write information into centralized or remote storage locations or databases 210. Some examples of information 220 that is contained in database 210 includes user preference or profiles or other information about users of the game.

One or more client machines 230 are coupled to the servers 200 by way of a communication channel. The communication channel may include wireless connections or wired connections to carry data signals between the server and the clients. A player 250 interacts with the game by way of his or her client machine 230 and software running on the client machine. The client machine itself 230 may be a personal computer or mobile processing apparatus with a communication module or capability. Software running on the client machine 230 is programmed to present queries 240 to the player 250. Some embodiments rely on browser software running on client 230. Other embodiments include apps that run on the mobile device of the user and derive functionality and data from an app server.

Various business methods and techniques for administering and operating the system 20 are possible. They include direct sale of game applications and data. They also include subscription based access to the gaming system 20. They also include revenue generation by way of advertising presented to the player community 260. In other embodiments, they also include revenue from wireless (or wired) communication providers who charge users for the use of the airwaves and communication channels discussed earlier.

Figure 3:
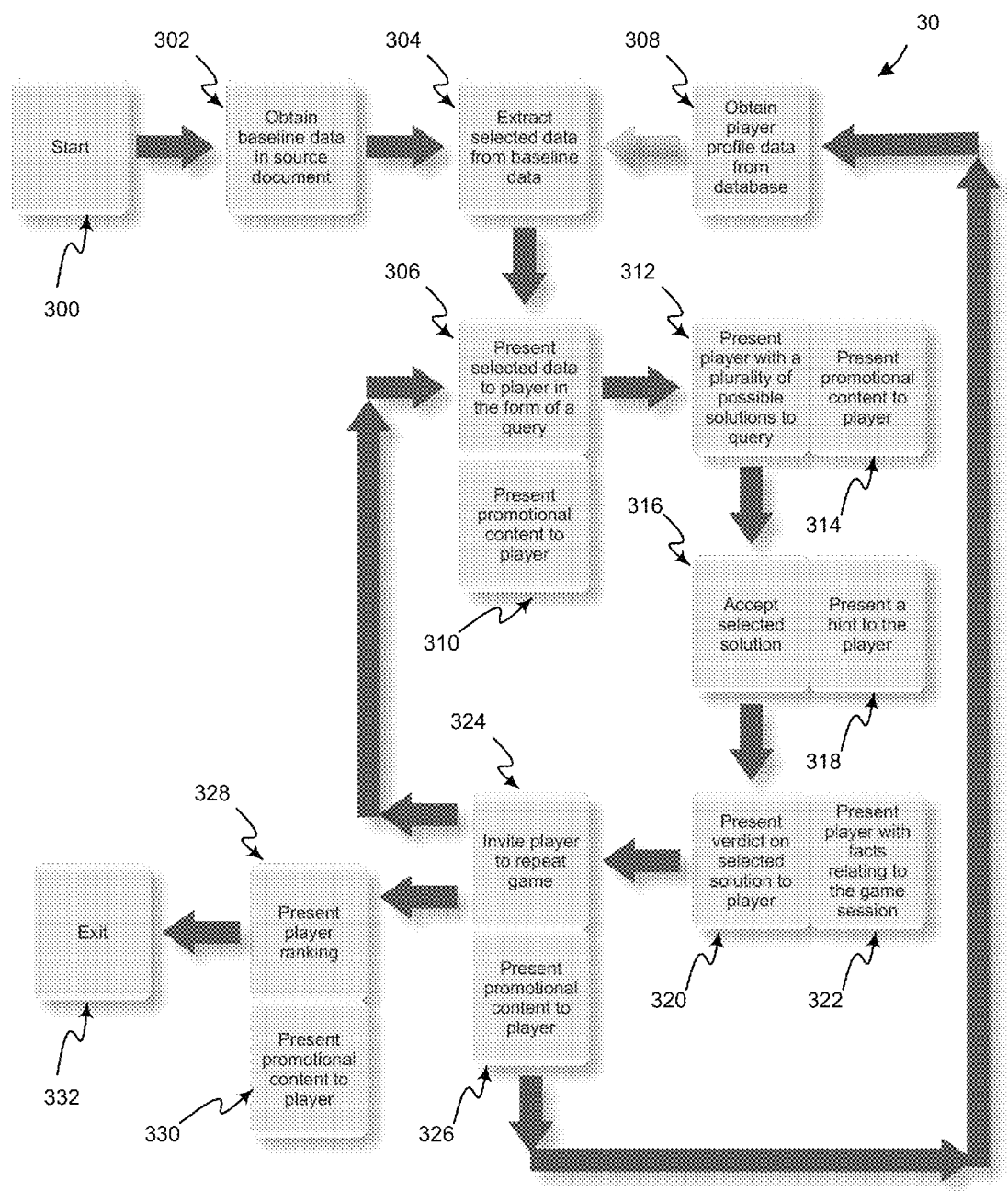
FIG. 3 illustrates an exemplary sequence of steps for interactive gameplay.

FIG. 3 illustrates various steps and elements of a method 30 running in a system for interactive gaming as discussed previously. The method starts at step 300 (Start). This can indicate the starting point in the logic flow for an operational software program executing in one or more circuits or processors and which are encoded into a digital memory device or similar instruction storage medium, sometimes referred to as a computer-readable or machine-readable medium.

Early in the operation of the method, some baseline data is obtained at step 302 from a database or similar repository. The baseline data may include information about academic, scientific, political, cultural, entertainment, personal, financial, sports, trivia, film, celebrity, or other information of interest to players of the interactive game.

An extractor module or unit or device or software component extracts selected data from the baseline data at step 304. For example, if the baseline data contains several types of information about a subject, the extraction step may chose a certain one or more types of information about the subject. Depending on the settings of the program and the preferences of a user, the extraction may select information that is selected because it is of use or interest to its user, the player. In an embodiment, player profile data or information is obtained at step 308, from a database of player profiles. The player profiles may be dynamic and updated as the player's interaction with the game and the gaming system progresses and becomes more known.

At step 306 the system presents the extracted and selected data to a player in the form of a query formulated by the gaming server and based on the extracted selected data. Promotional content such as advertising may be presented at steps 310 to the player on the player's client machine interface at any time during the gameplay. Promotions and advertising content may be presented to the player at optional steps 314 and 326 and 330 as well, if desired, or throughout the game or at key points during the game.

Once the player is presented with a query or question at step 306, the system accepts the player's selection (guess) at step 312 where the player chooses from among a plurality of available or possible presented answers or responses. In some embodiments, only one response is correct to answer the posed query. In other embodiments, more than one correct answer exists, and the player will be graded on some criterion or criteria for playing the game. The player chooses his or her answer and submits the choice to the system for evaluation. A hint may be given to players who are unsure of their answers at step 318.

The system evaluates the player's choice of response to the posed query or question. At step 320 the system presents a verdict or comment to the player on his or her answer or selection. The verdict or comment may include an indication of whether the player's answer was correct to the question or query posed. Trivia or facts relating to the subject matter of a game segment may be provided at step 322.

Once the player has concluded playing a segment or portion of the interactive game the system may invite the player to play another round or another game or to play again at step 324. Links or buttons may be presented to the player in a graphical user interface to accept the player's acceptance to play again or the player's refusal to play again.

If the player does not wish to continue playing another round, the system may present the player with his or her ranking, at step 328, relative to other players in the player community. A list of top scores may be summarized on the screen. If the player does choose to play another round, the player is presented with a selected query again.

At the conclusion of play the system may update the player's profile. Again, promotions or invitations to buy or review a product or service may be presented to the player at step 330.

The game or process ends at 332 if the player does not require or indicate another round, or if the player affirmatively opts to leave the gaming site.

The present gaming application system and method may be implemented on a computer or processor-based machine such as a server or other network-capable device. Communication may be carried out using conventional packet-based or standards-based messaging. A Web front end including a Web server may be employed to provide interactivity with users of client machines interacting with the Web server. A database of information containing data used for the game (containing educational content, entertainment content, trivia, personal information, news content, user profiles, etc.) is coupled to the Web server or other backend application server coupled to the Web server. An application programming interface (API) may further be provided to supply information used in game play over HTTP or other means. Some logic can further be installed on and executing on the players' client computers or mobile computing devices.

In a specific exemplary and non-limiting embodiment, the system includes a server, such as a Ruby server application with a Web front end and an iOS mobile application. The mobile application interacts with the server using a JSON API over HTTP. The server may be written in Ruby on Rails (e.g., release 3.0.0). The server is deployed over the Heroku cloud platform, or similar platform, for easy deployment and scaling.

The game state is saved in a Web browser cookie. In an embodiment, the game state may be wrapped in an object for easy access and manipulation. The cookie keeps track of the current game state of any given gaming session.

The game state may include the score, a number of lives left, and what select data or information have been used in the current game. In an embodiment, storing the latter prevents a portion of select data already used to be shown again in a single game. Using a client cookie to store this information means that little or no server resources are needed to store game state in some illustrative examples. The result of each question may be recorded in the database, allowing for analysis and providing data for question difficulty. At the conclusion of the game, the score may be saved to the database.

The present system and application may use PostgreSQL to store the select type of data from the baseline data in the database. The system may use smart data objects to pull down the necessary information from various web-based APIs and store it locally. These updates can be run periodically to provide fresh baseline data for the information for the game. For example, to keep abreast of headlines in the news.

An application programming interface (API) provides information needed for a client to play the game in JSON over HTTP. The logic is preferably handled by the client application, but the API provides all needed baseline data information (correct and incorrect answers, sample URL, image URL, and facts). On completion of the game, the client can post the score to the server to determine if it has made the high score list. In addition the API provides a mechanism for posting the results of each question.

The embodiments and description and drawings provided herein are illustrative and allow those skilled in the art to understand the inventions and to incorporate the inventions into systems and methods comprehended by the present disclosure and claims. The present embodiments should therefore not be considered exhaustive or limiting, but other derivative and similar techniques and devices relating hereto should be considered covered by the present scope of invention as well.

What is claimed is:

1. A method for interactive game play based on user interests, the method being implemented on a computing device having one or more physical processors programmed with computer program instructions, the method comprising:
   obtaining, by the one or more physical processors, a set of baseline data in one or more documents or files, wherein the set of baseline data includes first baseline data that is related to a particular topic;
   obtaining, by the one or more physical processors, a pre-stored user profile that indicates an interest by a user in one or more topics;
   identifying, by the one or more physical processors, the first baseline data from the set of baseline data based on the user profile and the particular topic;
   formulating, by the one or more physical processors, a trivia question based on the first baseline data such that the trivia question relates to a topic of interest of the user;
   formulating, by the one or more physical processors, a plurality of potential responses to the trivia question based on the first baseline data;
   presenting, by the one or more physical processors, the trivia question and the plurality of potential responses to the trivia question to the user;
   receiving, by the one or more physical processors, a response to the trivia question from the user; and
   determining, by the one or more physical processors, whether the response to the trivia question matches a criterion for correctness of the response.

2. The method of claim 1, further comprising presenting promotional content to the user during game play.

3. The method of claim 1, further comprising providing an indication of whether the response was correct.

4. The method of claim 1, the method further comprising:
   randomizing: (i) an order of appearance of the trivia question with respect to at least one other trivia question, or (ii) an order of appearance of the potential responses.

5. The method of claim 1, the method further comprising:
   determining a frequency of occurrence of first information in the first baseline data relative to other information in the set of baseline data.

6. The method of claim 5, the method further comprising:
   assigning a first weight to the first information based on the frequency of occurrence.

7. The method of claim 6, the method further comprising:
   determining an appearance of the first information based on the first weight; and
   displaying the first information based on the appearance.

8. The method of claim 6, wherein identifying the first baseline data is based further on the first weight.

9. The method of claim 1, the method further comprising:
   updating the user profile based on game play of the user such that the user is better known for future game play.

10. The method of claim 1, wherein the first baseline data comprises a word or an image that was selected from the set of baseline data to be included in the trivia question and/or responses to the trivia question.

11. A system for interactive game play based on user interests, the system comprising:
   one or more physical processors programmed with computer program instructions to:
   obtain a set of baseline data in one or more documents or files, wherein the set of baseline data includes first baseline data that is related to a particular topic;
   obtain a pre-stored user profile that indicates an interest by a user in one or more topics;
   identify the first baseline data from the set of baseline data based on the user profile and the particular topic;
   formulate a trivia question based on the first baseline data such that the trivia question relates to a topic of interest of the user;
   formulate a plurality of potential responses to the trivia question based on the first baseline data;
   present the trivia question and the plurality of potential responses to the trivia question to the user;
   receive a response to the trivia question from the user; and
   determine whether the response to the trivia question matches a criterion for correctness of the response.

12. The system of claim 11, wherein the one or more physical processors are further programmed to:
   present promotional content to the user during game play.

13. The system of claim 11, wherein the one or more physical processors are further programmed to:
   provide an indication of whether the response was correct.

14. The system of claim 11, wherein the one or more physical processors are further programmed to:

randomize (i) an order of appearance of the trivia question with respect to at least one other trivia question, or (ii) an order of appearance of the potential responses.

15. The system of claim 11, wherein the one or more physical processors are further programmed to:
determine a frequency of occurrence of first information in the first baseline data relative to other information in the set of baseline data.

16. The system of claim 15, wherein the one or more physical processors are further programmed to:
assign a first weight to the first information based on the frequency of occurrence.

17. The system of claim 16, wherein the one or more physical processors are further programmed to:
determine an appearance of the first information based on the first weight; and
display the first information based on the appearance.

18. The system of claim 16, wherein the first baseline data is identified based further on the first weight.

19. The system of claim 11, wherein the one or more physical processors are further programmed to:
update the user profile based on game play of the user such that the user is better known for future game play.

20. The system of claim 1, wherein the first baseline data comprises a word or an image that was selected from the set of baseline data to be included in the trivia question and/or responses to the trivia question.

* * * * *